(12) United States Patent
Kim et al.

(10) Patent No.: US 8,007,957 B2
(45) Date of Patent: Aug. 30, 2011

(54) ELECTRODE FOR FUEL CELL, FUEL CELL SYSTEM COMPRISING THE SAME, AND METHOD FOR PREPARING THE SAME

(75) Inventors: Hee-Tak Kim, Suwon-si (KR); Jan-Dee Kim, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 598 days.

(21) Appl. No.: 11/289,134

(22) Filed: Nov. 28, 2005

(65) Prior Publication Data
US 2006/0115712 A1 Jun. 1, 2006

(30) Foreign Application Priority Data
Nov. 26, 2004 (KR) .................. 10-2004-0097951

(51) Int. Cl.
*H01M 8/22* (2006.01)
*H01M 4/02* (2006.01)
*H01M 8/10* (2006.01)
*H01M 4/88* (2006.01)
*B05D 5/12* (2006.01)

(52) U.S. Cl. ........ 429/523; 429/405; 429/535; 429/492; 429/465; 429/479; 429/491; 502/101; 427/115

(58) Field of Classification Search .................. None
See application file for complete search history.

(56) References Cited

U.S. PATENT DOCUMENTS

| | | | |
|---|---|---|---|
| 4,293,396 A | 10/1981 | Allen et al. | |
| 5,879,827 A | 3/1999 | Debe et al. | |
| 6,183,668 B1 * | 2/2001 | Debe et al. | 252/510 |
| 6,368,476 B1 | 4/2002 | DeMarinis et al. | |
| 6,444,347 B1 | 9/2002 | Ouvry et al. | |
| 6,589,682 B1 * | 7/2003 | Fleckner et al. | 429/34 |
| 6,686,308 B2 | 2/2004 | Mao et al. | |
| 6,869,721 B2 | 3/2005 | Imazato | |
| 2002/0061433 A1 | 5/2002 | Kawamura et al. | |
| 2002/0127170 A1 | 9/2002 | Hong et al. | |
| 2002/0146615 A1 | 10/2002 | Yamaura | |

(Continued)

FOREIGN PATENT DOCUMENTS

CN 1278747 A 1/2001

(Continued)

OTHER PUBLICATIONS

Korean Patent Abstracts, Publication No. 10-1993-0020757, dated Oct. 20, 1993, in the name of Tae-Hee Lee et al.

(Continued)

*Primary Examiner* — Barbara L. Gilliam
*Assistant Examiner* — Angela J Martin
(74) *Attorney, Agent, or Firm* — Christie, Parker & Hale, LLP

(57) ABSTRACT

The electrode for a fuel cell of the present invention includes a carbonaceous electrode substrate, a microporous layer formed on the surface of the electrode substrate with the microporous layer including a carbonized polymer, and nano-carbon formed on the surface of the microporous layer with a catalyst layer coated on the surface of the nano-carbon. Alternatively, an electrode for a fuel cell includes a carbonaceous electrode substrate in which carbon particles are dispersed, a nano-carbon on the electrode substrate with a catalyst layer on the surface of the nano-carbon.

34 Claims, 4 Drawing Sheets

U.S. PATENT DOCUMENTS

| | | | |
|---|---|---|---|
| 2002/0175073 A1* | 11/2002 | Nakamura et al. | 204/294 |
| 2002/0177032 A1* | 11/2002 | Suenaga et al. | 429/44 |
| 2003/0086859 A1* | 5/2003 | Kawakami et al. | 423/447.1 |
| 2004/0053111 A1 | 3/2004 | Matsumoto | |
| 2004/0076870 A1 | 4/2004 | Tanaka et al. | |
| 2004/0076871 A1 | 4/2004 | Gascoyne et al. | |
| 2004/0191602 A1 | 9/2004 | Ishikawa et al. | |
| 2004/0197638 A1* | 10/2004 | McElrath et al. | 429/44 |
| 2004/0234841 A1 | 11/2004 | Yoshitake et al. | |
| 2005/0287418 A1* | 12/2005 | Noh et al. | 429/40 |
| 2006/0115712 A1 | 6/2006 | Kim et al. | |
| 2006/0172179 A1* | 8/2006 | Gu et al. | 429/44 |

FOREIGN PATENT DOCUMENTS

| | | |
|---|---|---|
| CN | 1303525 | 7/2001 |
| CN | 1498435 A | 5/2004 |
| CN | 1523698 | 8/2004 |
| CN | 1630676 A | 6/2005 |
| EP | 1 336 998 A1 | 8/2003 |
| EP | 1336998 A1 * | 8/2003 |
| EP | 1 383 186 A1 | 1/2004 |
| JP | 62-232860 | 10/1987 |
| JP | 08-017440 | 1/1996 |
| JP | 2000-260435 | 9/2000 |
| JP | 2001-216973 | 8/2001 |
| JP | 2002-110181 | 4/2002 |
| JP | 2002-298861 | 10/2002 |
| JP | 2002-534773 | 10/2002 |
| JP | 2003-115302 | 4/2003 |
| JP | 2003-200052 | 7/2003 |
| JP | 2004-036038 | 2/2004 |
| JP | 2004-059428 | 2/2004 |
| JP | 2004-103592 | 4/2004 |
| JP | 2004-152489 | 5/2004 |
| JP | 2004-288489 | 10/2004 |
| JP | 2004-311276 | 11/2004 |
| JP | 2004-362875 | 12/2004 |
| JP | 2005-100748 | 4/2005 |
| KR | 1993-0020757 | 10/1993 |
| KR | 95-28209 | 10/1995 |
| KR | 2003-0038771 | 5/2003 |
| KR | 2003-0095694 | 12/2003 |
| KR | 10-2004-011181 | 2/2004 |
| KR | 1020040011181 A * | 2/2004 |
| KR | 10-2004-0051287 | 6/2004 |
| WO | WO 99/33132 | 7/1999 |
| WO | WO 01/80334 A2 | 10/2001 |
| WO | WO 02/17427 A1 | 2/2002 |
| WO | WO 02/27828 A1 | 4/2002 |
| WO | WO 02/27830 A1 | 4/2002 |
| WO | WO 02/41432 A1 | 5/2002 |
| WO | WO 02/073722 A1 | 9/2002 |
| WO | WO 02/075831 A1 | 9/2002 |
| WO | WO 03/083128 A2 | 10/2003 |
| WO | WO 2005/044723 A | 5/2005 |

OTHER PUBLICATIONS

Tang, Hao et al., *Deposition and electrocatalytic properties of platinum on well-aligned carbon nanotube (CNT) arrays for methanol oxidation*; Materials Chemistry and Physics 92 (2005) pp. 548-553.

Che, Guangli et al.; *Metal-Nanocluster-Filled Carbon Nanotubes: Catalytic Properties and Possible Applications in Electrochemical Energy Storage and Production*; Langmuir 1999, vol. 15, pp. 750-758; XP-000964916.

Extended European Search Report for corresponding application EP 06118097.2-2119; dated Oct. 6, 2006, indicating relevance of references in this IDS.

Korean Patent Abstracts for Publication No. 1020040051287 A; Date of publication of application Jun. 18, 2004, in the name of Hye Gyeong Kim.

Korean Patent Abstracts for Publication No. 1020040011181 A; Date of publication of application Feb. 5, 2004, in the name of Won Bong Choi, et al.

Korean Patent Abstracts for Publication No. 1020030095694 A; Date of publication of application Dec. 24, 2003, in the name of U Yeong Jung, et al.

B. Rajesh et al.; *Pt-$WO_3$ Supported on Carbon Nanotubes as Possible Anodes for Direct Methanol Fuel Cells*; Fuel; vol. 81; (2002); pp. 2177-2190.

European Search Report, dated Mar. 6, 2006, for Application No. 05111129.2 in the name of Samsung SDI Co., Ltd.

U.S. Office action dated Jan. 22, 2009, for related U.S. Appl. No. 11/126,483, indicating relevance of listed reference in this IDS.

Patent Abstracts of Japan, Publication No. 2004-036038, dated Feb. 5, 2004, in the name of Hiroshi Hosokawa et al.

Patent Abstracts of Japan, Publication No. 2004-152489, dated May 27, 2004, in the name of Yuichi Shimakawa et al.

Patent Abstracts of Japan, Publication No. 62-232860, dated Oct. 13, 2007, in the name of Choichi Furuya et al.

Japanese Office action dated Oct. 27, 2009, for corresponding Japanese application 2005-183925, noting listed reference in this IDS, as well as WO 02/073722 previously filed in an IDS dated Nov. 11, 2008.

Japanese Office action dated Oct. 27, 2009, for Japanese application 2005-340578, noting listed references in this IDS.

U.S. Office action dated Sep. 29, 2009, for related U.S. Appl. No. 11/494,851, noting U.S. Publications 2006/0115712 and 2006/0172179 listed in this IDS.

U.S. Office action dated Nov. 10, 2009, for related U.S. Appl. No. 11/126,483, noting U.S. Publication 2004/0053111 listed in this IDS.

Japanese Office action dated Apr. 20, 2010, for—Japanese Patent application 2006-208240, noting listed references in this IDS.

U.S. Office action dated Mar. 19, 2010, for related U.S. Appl. No. 11/494,851.

U.S. Office action dated Apr. 28, 2010, for related U.S. Appl. No. 11/126,483.

U.S. Office action dated Jun. 21, 2010, for related U.S. Appl. No. 11/221,999.

U.S. Office action dated Aug. 4, 2010, for related U.S. Appl. No. 11/126,483, noting listed U.S. reference in this IDS.

U.S. Office action dated Aug. 18, 2010, for related U.S. Appl. No. 11/494,851, noting International publication WO 2005/044723, previously filed in an IDS dated Apr. 30, 2010.

Patent Abstracts of Japan and English machine translation for JP 2001-216973.

Japanese Patent Office Action dated Nov. 2, 2010, issued in corresponding Japanese application No. JP 2005-261157, listing the Foreign Patent Documents references cited in this IDS.

U.S. Office action dated Dec. 8, 2010 in related U.S. Appl. No. 11/221,000 (9 sheets).

* cited by examiner

ELECTRODE FOR FUEL CELL, FUEL CELL SYSTEM COMPRISING THE SAME, AND METHOD FOR PREPARING THE SAME

CROSS REFERENCE TO RELATED APPLICATION

This application claims priority to and the benefit of Korean Patent Application No. 10-2004-0097951 filed in the Korean Industrial Property Office on Nov. 26, 2004, the contents of which are incorporated hereinto by reference.

BACKGROUND OF THE INVENTION (a) Field of the Invention

The present invention relates to an electrode for a fuel cell system, a fuel cell including the same, and a method for preparing the same, and more particularly to an electrode which has a large surface area and thus improves electrochemical reaction, a fuel cell system including the same, and a method for preparing the same.

(b) Description of the Related Art

A fuel cell is a power generation system that generates electrical energy through an electrochemical redox reaction of an oxidant and a fuel such as hydrogen or a hydrocarbon-based material such as methanol, ethanol, or natural gas.

Fuel cells can be classified as phosphoric acid type, molten carbonate type, solid oxide type, polymer electrolyte type, or alkaline type cell depending on the kind of electrolyte used. Although each fuel cell effectively operates in accordance with the same basic principles, they may differ from one another in the kind of fuel, operating temperature, catalyst, and electrolyte used depending on the type of fuel cell.

Recently, polymer electrolyte membrane fuel cells (PEMFC) have been developed with power characteristics superior to those of conventional fuel cells, lower operating temperatures and faster starting and response characteristics. PEMFCs have advantages in that they can have a wide range of applications such as for mobile power sources for automobiles, distributed power sources for houses and public buildings, and for small electric sources for electronic devices.

A polymer electrolyte membrane fuel cell is generally composed of a stack, a reformer, a fuel tank, and a fuel pump. The fuel pump provides fuel stored in the fuel tank to the reformer. The reformer reforms the fuel to generate hydrogen and supplies the hydrogen to the stack. The stack forms the body of the polymer electrolyte fuel cell and is where the hydrogen is electrochemically oxidized and the oxidant is reduced to generate electrical energy.

A fuel cell may be a direct methanol fuel cell (DMFC) in which liquid methanol fuel is directly introduced to the stack. Consequently, the direct methanol fuel cell can omit the reformer which is essential for the polymer electrolyte fuel cell.

According to the above-mentioned fuel cell system, the stack generally includes several or a several tens of unit cells, each consisting of a membrane electrode assembly (MEA) and a separator (also referred to as a "bipolar plate") laminated together. The membrane electrode assembly is composed of an anode (referred to as a "fuel electrode" or "oxidation electrode") and a cathode (referred to as an "air electrode" or "reduction electrode"), separated by the polymer electrolyte membrane.

The separators not only work as passageways for supplying the fuel to the anode and the oxidant to the cathode, but they also work as a conductor, serially connecting the anode and the cathode in the membrane-electrode assembly. While the electrochemical oxidation reaction of the fuel occurs on the anode, the electrochemical reduction reaction of the oxidant occurs on the cathode, thereby producing electricity, heat, and water due to the migration of the electrons generated during this process.

The anode or cathode generally includes a platinum (Pt) catalyst. However, platinum is a rare and expensive metal and thus is not typically used in large amounts. In this regard, in order to reduce the amount of platinum, platinum supported on carbon is usually used.

The platinum supported on the carbon causes an increased thickness of the catalyst layer, and there is a limitation with respect to the amount of platinum that can be stored on the carbon. Additionally, contact between the catalytic layer and the membrane is not optimum, which deteriorates performance of the fuel cell.

Therefore, it is desirable to develop an electrode for a fuel cell that has reduced catalyst quantity in the catalyst layer but still shows excellent cell performance.

SUMMARY OF THE INVENTION

An embodiment of the present invention provides an electrode for a fuel cell that includes a catalyst having a large surface area and improved reaction efficiency.

Another embodiment of the present invention provides a membrane-electrode assembly for a fuel cell that includes the electrode for a fuel cell.

An additional embodiment of the present invention provides a fuel cell system including the electrode for a fuel cell.

A further embodiment of the present invention provides a method for fabricating the electrode for a fuel cell.

According to a particular embodiment, the present invention provides an electrode for a fuel cell which includes a carbonaceous electrode substrate, a microporous layer including carbonized polymer formed on the surface of the electrode substrate, and nano-carbon formed on the surface of the microporous layer with a catalyst layer coated on the surface of the nano-carbon.

An exemplary embodiment of the present invention provides an electrode for a fuel cell which includes a carbonaceous electrode substrate in which carbon particles are dispersed, nano-carbon formed on a surface of the electrode substrate, and a catalyst layer coated on a surface of the nano-carbon.

The present invention further provides a membrane-electrode assembly which includes a polymer electrolyte membrane and electrodes positioned on both sides of the polymer electrolyte membrane, each electrode including a carbonaceous electrode substrate, a microporous layer including a carbonized polymer formed on the surface of the electrode substrate, and nano-carbon formed on the surface of the microporous layer with a catalyst layer coated on the surface of the nano-carbon.

The present invention further provides a fuel cell system which includes electricity generating units containing:
a membrane-electrode assembly including a polymer electrolyte membrane and the above electrodes positioned on both sides of the polymer electrolyte membrane, and separators positioned on both sides of the membrane-electrode assembly which generate electricity through the electrochemical reaction of hydrogen and an oxidant; a fuel supplying unit for supplying hydrogen or fuel including hydrogen to the electricity generating unit; and
an oxidant supplying unit for supplying oxygen to the electricity generating unit.

The present invention further provides a method of preparing an electrode for a fuel cell which includes
forming a microporous layer on a surface of a carbonaceous electrode substrate;
heat-treating the carbonaceous electrode substrate with the microporous layer to carbonize a polymer in the microporous layer;
introducing a first catalyst for synthesizing nano-carbon on the surface of the microporous layer and providing a reactive gas including a carbon source gas on the first catalyst to grow nano-carbon; and
coating the nano-carbon with a second catalyst to form a catalyst layer.

BRIEF DESCRIPTION OF THE DRAWINGS

The present invention will be described more fully hereinafter with reference to the accompanying drawings, in which embodiments of the invention are shown.

DETAILED DESCRIPTION OF THE INVENTION

In the following detailed description, embodiments of the invention have been shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature, and not restrictive.

In most cases, expensive noble metals are used as metal catalysts for a membrane-electrode assembly in a fuel cell. Among them all, platinum is used most widely. Therefore, it is desirable to reduce the quantity of the metal catalyst while maintaining the performance of a fuel cell.

A method for reducing the quantity of the metal catalyst used is to deposit the catalyst on a substrate to form a catalyst layer. However, the surface area of the catalyst layer depends on the surface area of the substrate on which the catalyst is deposited. If the catalyst layer has a small surface area, the output characteristics of the fuel cell are degraded. Thus, it is advantageous to enlarge the surface area of the substrate where the catalyst is deposited.

In an electrode according to an embodiment of the present invention, the thickness of the metal catalyst layer can be significantly reduced and the surface area can be increased by maximizing the surface area of the electrode substrate and coating the catalyst thereon.

Figure 1A:
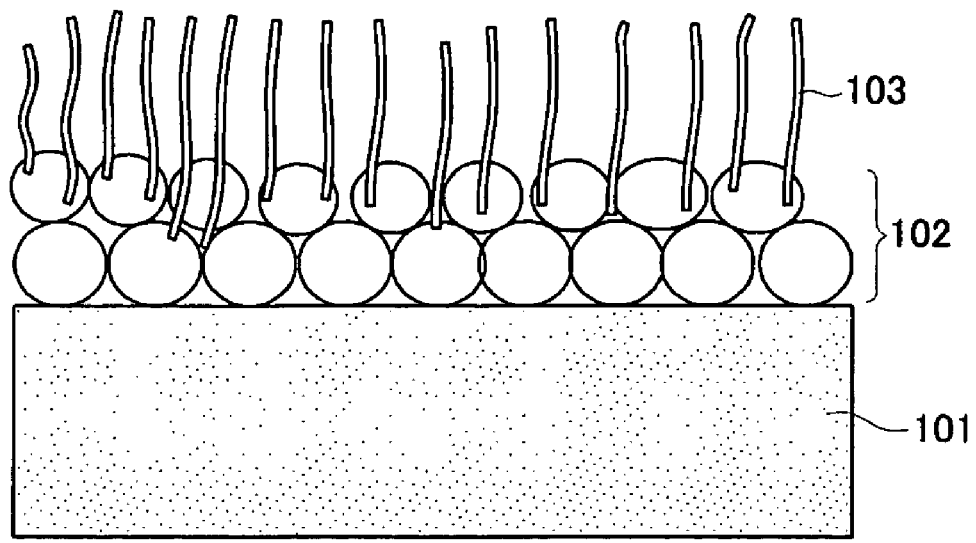
FIG. 1A is a schematic cross-sectional view showing an electrode substrate before a catalyst coating is applied.
Figure 1B:
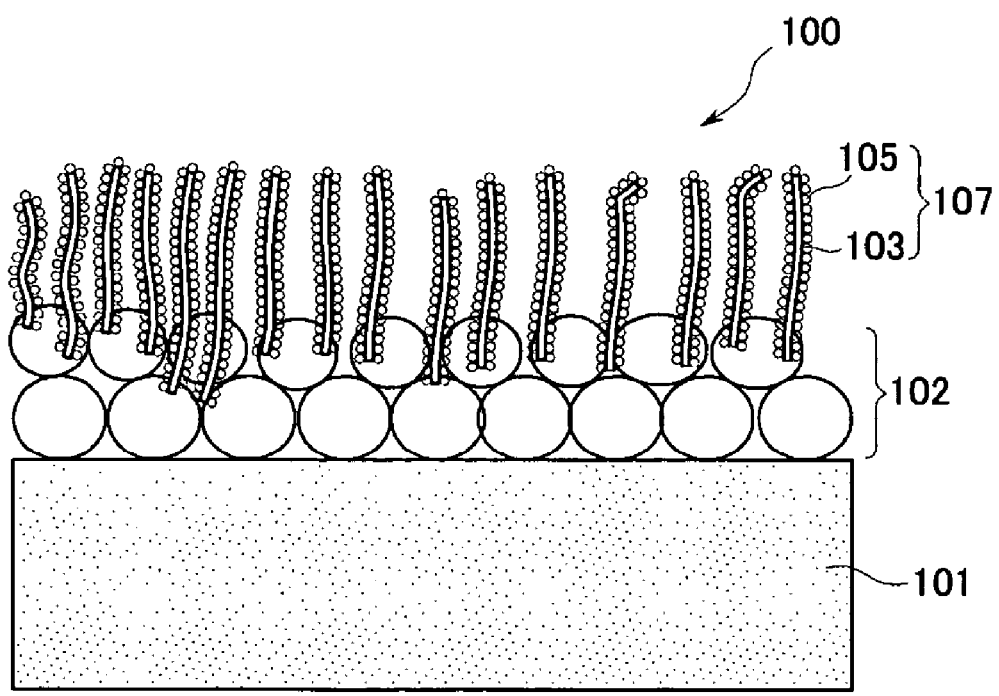
FIG. 1B is a schematic cross-sectional view showing an electrode for a fuel cell with a catalyst coating in accordance with the present invention.

FIG. 1A is a schematic cross-sectional view showing an electrode substrate with a maximized specific surface area, and FIG. 1B is a schematic cross-sectional view showing an electrode for a fuel cell that has a catalyst coated on the surface of an electrode substrate in accordance with an embodiment of the present invention.

Referring to FIGS. 1A and 1B, the electrode 100 for a fuel cell includes an electrode substrate 101, a microporous layer 102 formed on the surface of the electrode substrate 101, and a catalyst layer 107 including nano-carbon 103 formed on the surface of the microporous layer 102 and catalyst 105 coated on the surface of the nano-carbon 103.

The electrode substrate 101 performs the role of a supporter of the electrode 100, and at the same time, performs a role of a path for transferring fuels and oxidants to the catalyst 105. In an embodiment of the present invention, the electrode substrate 101 is selected from the group consisting of carbon paper, carbon cloth, and carbon felt. The electrode substrate 101 plays a role in diffusing reactants to the catalyst layer 107 and thus is generally called a diffusion layer.

In one embodiment of the invention, the electrode substrate has a thickness from 10 μm to 1000 μm, and more preferably 10 μm to 700 μm. When the electrode substrate has a thickness of less than 10 μm, it cannot serve as a supporter. When it has a thickness of more than 1000 μm, the reactants such as fuel and oxidant cannot be supplied smoothly.

The electrode further includes a microporous layer (MPL) 102 for improving diffusion of reactants. In an embodiment of the invention, the microporous layer preferably has a roughness factor at or between 5 and 100. The roughness factor is a value obtained by dividing the surface area of the microporous layer by the area of the microporous layer. When the roughness factor is less than 5, the amount of nano-carbon formed thereon is too small to perform its required function, and it is difficult to form a surface with a roughness factor of more than 100.

The microporous layer 102 performs a role of uniformly supplying reactants to the catalyst layer, and transferring electrons which are formed on the catalyst layer to the polymer membrane. In one embodiment of the invention, the microporous layer includes a conductive material such as carbon powder, graphite, fullerene (C60), carbon black, acetylene black, activated carbon, or nano-carbon such as carbon nanotubes, carbon nanofiber, carbon nanowire, carbon nanohorns, or carbon nanorings.

In one embodiment of the present invention, the microporous layer 102 has a thickness of 1 μm to 100 μm, more preferably 1 μm to 80 μm. When the microporous layer has a thickness of less than 1 μm, the reactants cannot be diffused indiscriminately. When it has a thickness of more than 100 μm, the reactants cannot be supplied smoothly.

The microporous layer 102 includes a carbonized polymer, and the electrode substrate may also include a carbonized polymer. Suitable polymers include polyvinylalcohol, polyacrylonitrile, phenol resin, polytetrafluoroethylene (PTFE), polyvinylidene fluoride, copolymers of polyvinylidene fluoride and hexafluoropropylene ((PVdF-HFP), cellulose acetate, and the like.

The catalyst layer 107 is formed on the surface of the microporous layer 102, and includes the nano-carbon 103 and catalyst 105, which is coated on the surface of the nano-carbon 103.

In one embodiment of the present invention, the nano-carbon 103 is selected from the group consisting of carbon nanotubes (CNT), carbon nanofiber, carbon nanowire, carbon nanohorns, carbon nanorings, and combinations thereof.

In another embodiment, the nano-carbon 103 is preferably grown in a direction vertical to the surface of the microporous layer, and directly on the surface thereof.

In an additional embodiment of the present invention, the nano-carbon has a diameter of 1 to 500 nm and a length of 50 to 5000 nm. Generally, the smaller the diameter of the nano-carbons, the better. However, when the diameter is smaller than 1 nm, there is a problem in fabricating the nano-carbon. When it is larger than 500 nm, the surface area increase effect is small. Also, when the nano-carbon has a length shorter than 50 nm, the surface area of the nano-carbon is low, which makes it hard to supply fuel. When the nano-carbon has a length longer than 500 nm, reactant diffusion is not as smooth and coating the catalyst on the entire surface of the nano-carbon is difficult.

In a further embodiment, the catalyst layer 107 has a thickness of 0.05 μm to 10 μm. When the catalyst layer has a thickness of less than 0.05 μm, the surface area does not increase sufficiently. When it has a thickness of more than 10 μm, the surface increasing effect is saturated, and unfavorably induces an increase in the thickness of the electrode.

In another embodiment of the present invention, the content of the catalyst in the catalyst layer 107 is 0.001 to 0.5 mg/cm$^2$ per unit area, more preferably 0.001 to 0.2 mg/cm$^2$, and still more preferably 0.01 to 0.05 mg/cm$^2$. When the content of the catalyst in the catalyst layer is less than 0.001 mg/cm$^2$, the fuel cell may not have sufficient efficiency. When the catalyst content exceeds 0.5 mg/cm$^2$, the utilization of the catalyst diminishes and porosity of the catalyst layer decreases, resulting in inhibition of reactant diffusion.

In an additional embodiment, the specific surface area of the catalyst included in the catalyst layer 107 is 10 to 500 m$^2$/g per unit weight, and more preferably 50 to 500 m$^2$/g. Since an oxidation/reduction reaction of the fuel cell occurs on the surface of the catalyst, the fuel cell has excellent efficiency as it has a large specific surface area per unit weight. Thus, when the specific surface area per unit weight is smaller than 10 m$^2$/g, the fuel cell has reduced efficiency. When the specific surface area per unit weight is more than 500 m$^2$/g, it is difficult to fabricate the fuel cell.

In a further embodiment, the catalyst layer 107 is formed by forming nano-carbon 103 on the microporous layer 102 and coating a metal catalyst 105 on the surface of the nano-carbon 103. Metal catalysts include platinum, ruthenium, osmium, and platinum-transition metal alloys. The transition metals are selected from the group consisting of Ru, Os, Co, Pd, Ga, Ti, V, Cr, Mn, Fe, Co, Ni, Cu, Zn, and combinations thereof.

The catalyst layer is coated on the surface of the nano-carbon using methods such as sputtering, physical vapor deposition (PVD), plasma enhanced chemical vapor deposition (PECVD), thermal chemical vapor deposition, electron beam evaporation, vacuum thermal evaporation, laser ablation, thermal evaporation, and the like.

Hereinafter, a method for a preparing one embodiment of an electrode for a fuel cell according to the present invention, is described in more detail.

A microporous layer 102 is formed on a surface of an electrode substrate 101. The electrode substrate 101 is preferably treated with a water-repellent agent such as polytetrafluoroethylene (PTFE). The microporous layer 102 is prepared by coating the electrode substrate 101 with a composition including conductive materials, binder resin, and solvent. The conductive material may be selected from carbon, graphite, fullerene (C60), carbon black, acetylene black, activated carbon, and nano-carbon such as carbon nanotubes, carbon nanofiber, carbon nanowire, carbon nanohorns, carbon nanorings, and mixtures thereof. The binder resin may be selected from polytetrafluoroethylene (PTFE), polyvinylidene fluoride, copolymers of polyvinylidene fluoride and hexafluoropropylene (PVdF-HFP), polyvinylalcohols, cellulose acetates, and the like. The solvent may be selected from alcohols such as ethyl alcohol, isopropyl alcohol, n-propyl alcohol, butyl alcohol, and the like, water, dimethyl acetamide (DMAc), dimethylformamide, dimethylsulfoxide (DMSO), N-methylpyrrolidone, tetrahydrofuran, and the like. The coating may be performed using screen printing, spray printing, coating using a doctor blade, gravure coating, dip coating, a silk screen method, and painting according to viscosity of the coating composition, but is not limited thereto.

The electrode substrate with the microporous layer 102 is heat-treated to carbonize polymers which are present in the substrate and the microporous layer. The heat-treatment is preferably performed at a temperature ranging from 600 to 1500° C. for 30 to 300 minutes. When the temperature is less than 600° C., the carbonization of the polymer is not completely performed, whereas when it is more than 1500° C., the specific surface area decreases.

In order to grow nano-carbon 103, a first catalyst for synthesizing the nano-carbon and a reactive gas, including a carbon source gas, are introduced on the surface of the microporous layer 102, which includes a carbonized polymer. The first catalyst may comprise a metal such as Fe, Ni, Co, Y, Pd, Pt, Au, Pd, Ga, Ti, V, Cr, Mn, Cu, Ta, W, Mo, Al, and alloys of the metals, and metal-containing compounds such as carbide, boride, oxide, nitride, sulfide, sulfate, nitrate, and the like. Among the metals, Fe, Ni, alloys thereof, and a metal-containing compound such as carbide, boride, oxide, nitride, sulfide, sulfate, and nitrate are preferred.

The first catalyst may be introduced by electrophoresis, a thermal spray method, a sputtering method, and the like, and is dispersed uniformly on the surface of the microporous layer.

The carbon source gas includes hydrocarbon gasses such as ethylene, acetylene, methane, and the like, and carbon monoxide or carbon dioxide, but is not limited thereto. The carbon source gas can also be introduced along with an inert gas such as nitrogen or argon gas.

A substrate on which nano-carbon 103 is grown should have a large surface so that the nano-carbon 103 may have a large surface area. Substrates such as carbon paper, carbon cloth, and carbon felt have a non-uniform surface, and thus cannot increase the surface of the nano-carbon 103 sufficiently. Therefore, in an embodiment of the present invention, a substrate where a microporous layer is formed on an electrode substrate so as to increase a surface area of the nano-carbon is used.

Direct synthesis of nano-carbon on the substrate using deposition should be performed at a high temperature of more than 600° C. During such deposition, however, the polymer used for the water-repellent treatment of the electrode substrate or the binder resin for formation of the microporous layer may decompose. In an embodiment of the present invention, the polymer of the electrode substrate and the microporous layer are pre-carbonized, and thus decomposition of the polymer is prevented in subsequent deposition of nano-carbon, and collapse of the electrode structure is also prevented.

A catalyst layer is formed by coating the nano-carbon with a second catalyst. The second catalyst may include platinum, ruthenium, osmium, or platinum-transition metal alloys, and the transition metals includes Ru, Os, Co, Pd, Ga, Ti, V, Cr, Mn, Fe, Co, Ni, Cu, and Zn and combinations thereof. The second catalyst is applied using a deposition method including sputtering, physical vapor deposition (PVD), plasma enhanced chemical vapor deposition (PECVD), thermal chemical vapor deposition, electron beam evaporation, vacuum thermal evaporation, laser ablation, thermal evaporation and combinations thereof. The deposition is not limited to the above-listed methods.

The synthesis of the nano-carbon can be performed by using an electrode substrate on which a microporous layer is formed, a synthesizing apparatus including a reactor where nano-carbon is synthesized by a catalyst, and a unit supplying reactive gas.

In one embodiment of the present invention, after coating the second catalyst onto the nano-carbon, the first catalyst is removed in order to improve the efficiency of the second catalyst. The first catalyst can be removed using an acid treatment, but is not limited thereto. For the acid treatment, nitric acid, sulfuric acid, hydrochloric acid, acetic acid, and the like can be used.

Figure 2:
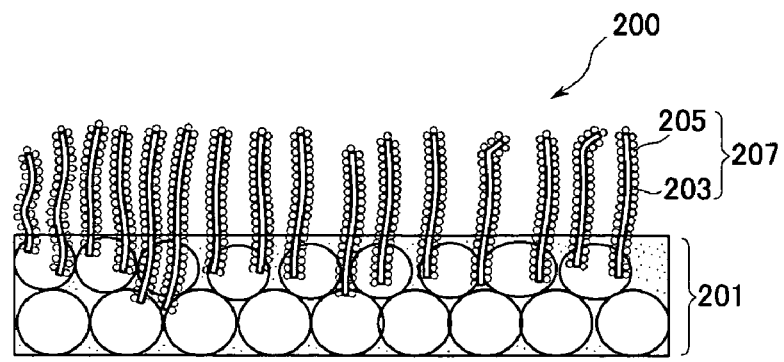
FIG. 2 is a schematic cross-sectional view showing an electrode for a fuel cell in accordance with another embodiment of the present invention.

According to another embodiment, the electrode substrate and the microporous layer may be combined. Referring to FIG. 2, the electrode 200 includes an electrode substrate 201 including carbon particles dispersed therein and a catalyst layer 207. The catalyst layer 207 includes nano-carbon 203 formed on a surface of the electrode substrate 201, and a catalyst 205 coated on a surface of the nano-carbon 203. The nano-carbon 203 and the catalyst 205 are the same as described above.

According to a another embodiment, the present invention also provides an electrode-membrane assembly including an electrode described above. The electrode-membrane assembly is prepared by positioning the above electrode on both sides of the polymer electrolyte membrane.

According to a further embodiment, a fuel cell system including an electrode-membrane assembly described above is provided. The fuel cell system includes: electricity generating units which include membrane-electrode assemblies comprising a polymer electrolyte membrane and the above electrodes according to the embodiments above, positioned on both sides of the polymer electrolyte membrane, and a separator positioned on both sides of the membrane-electrode assembly, which generates electricity through an electrochemical reaction of hydrogen and an oxidant; a fuel supplying unit for supplying hydrogen or fuel including hydrogen to the electricity generating unit; and an oxidant supplying unit for supplying oxygen to the electricity generating unit.

Figure 3:
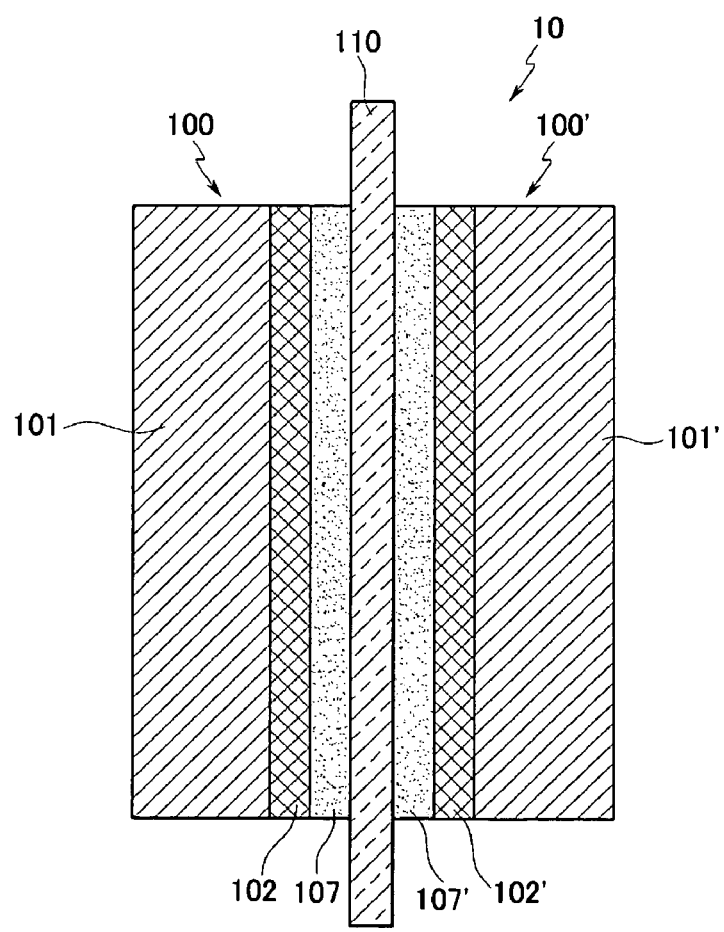
FIG. 3 is a schematic cross-sectional view depicting an electrode-membrane assembly for a fuel cell in accordance with an embodiment of the present invention.

FIG. 3 is a schematic cross-sectional view illustrating a membrane-electrode assembly comprising an electrode for a fuel cell in accordance with an embodiment of the present invention. Referring to FIG. 3, the membrane-electrode assembly 10 includes an electrode for a fuel cell of the present invention comprising a polymer electrolyte membrane 110 and electrodes 100 and 100' positioned on both sides of the polymer electrolyte membrane 110.

The membrane-electrode assembly 10 further includes an anode (or cathode) 100 and cathode (or anode) 100' which are respectively positioned on both surfaces of the polymer electrolyte membrane 110. At the anode, an oxidation reaction of the fuel occurs to generate protons, $H^+$, and electrons, $e^-$. The polymer electrolyte membrane 110 transmits the generated protons to the cathode. The transmitted protons on the cathode are electrochemically reacted with oxygen supplied on the cathode to generate water.

The polymer electrolyte membrane 110 includes a proton-conducting polymer, and may be selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyether-etherketone-based polymers, and polyphenylquinoxaline-based polymers. In one embodiment, the proton-conducting polymer may include a polymer selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, aryl ketones, poly(2,2'-(m-phenylene)-5,5'-bibenzimidazole), and poly(2,5-benzimidazole). However, according to the present invention, a proton-conducting polymer included in a polymer electrolyte membrane for a fuel cell is not limited to these polymers.

Figure 4:
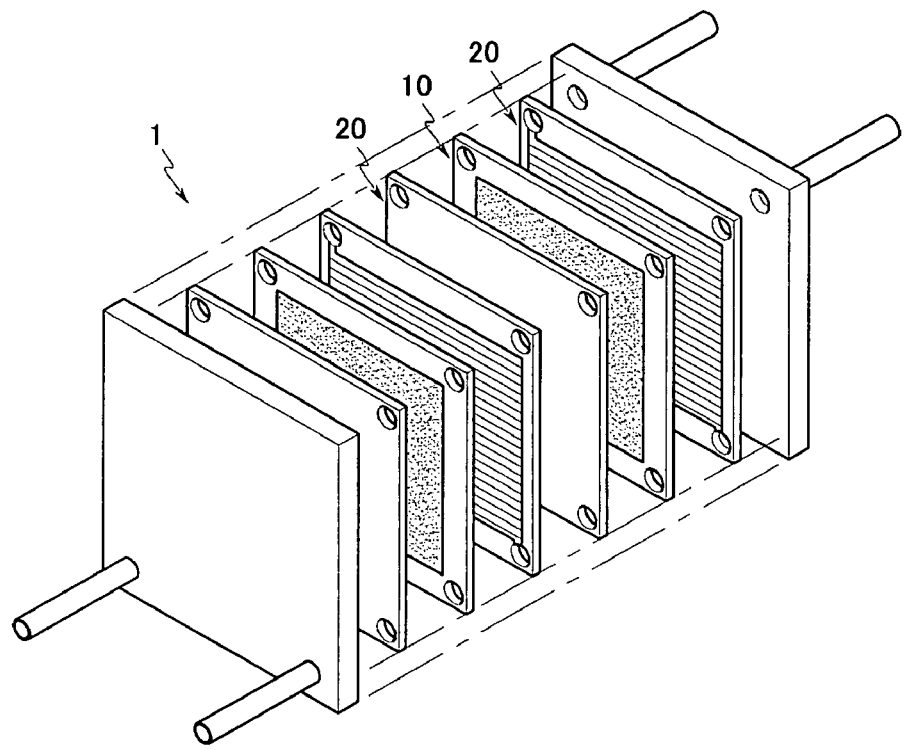
FIG. 4 is an exploded perspective view of a stack which includes an embodiment of the electrode of the present invention.

Separators are positioned on both sides of the membrane-electrode assembly to form an electricity generating unit. Through the separators, fuel and oxygen are supplied to the catalyst layer, and electricity is generated through the electrochemical reaction of hydrogen and oxygen. At least two electricity generating units may be combined to form a stack. FIG. 4 is a schematic exploded perspective view illustrating a stack. Referring to FIG. 4, the stack 1 includes a membrane-electrode assembly 10 including the electrode for a fuel cell, and separators 20 positioned on both sides of the membrane-electrode assembly 10.

Figure 5:
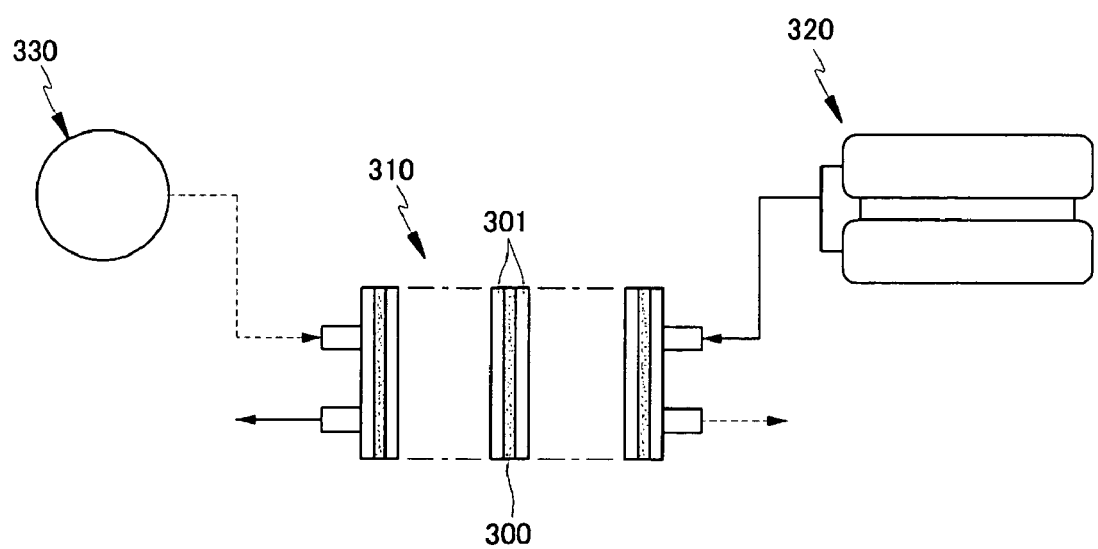
FIG. 5 is a schematic view showing a fuel cell system according to the present invention.

FIG. 5 shows the schematic structure of a fuel cell system of the present invention. Referring to FIG. 5, a fuel cell system includes an electricity generating unit 310, a fuel supplying unit 320, and an oxidant supplying unit 330. The electricity generating unit 310 includes a membrane-electrode assembly 300, and separators 301 to be positioned at both sides of the membrane-electrode assembly 300.

The fuel and oxidant are provided to the electricity generating unit through pumps or in a diffusion manner.

The fuel cell system of the present invention can be a phosphoric acid type, a polymer electrolyte type, a direct oxidation type, or an alkaline type of fuel cell system. In an embodiment of the present invention, it can be used for a Polymer Electrolyte Membrane Fuel Cell (PEMFC) or a Direct Oxidation Fuel Cell (DOFC) such as a Direct Methanol Fuel Cell (DMFC).

The following examples illustrate the present invention in further detail; however, it is understood that the present invention is not limited by these examples.

Example 1

3 g of carbon black, 0.5 g of polyvinylalcohol (PVA), and 20 g of isopropyl alcohol as a solvent were mixed to prepare a composition. The composition was coated on a 200 μm-thick carbon cloth that was water-repellent, treated with PTFE to form a microporous layer, and then the carbon cloth was heat-treated at 1000° C. for 240 minutes to carbonize the polyvinylalcohol. On the surface of the microporous layer including the carbonized polyvinylalcohol, Fe as a first catalyst and acetylene gas as a carbon source along with argon gas were introduced into an 800° C. reactor for 20 minutes to grow carbon nanotubes having a length of 2000 nm.

On the surface of the carbon nanotubes, Pt was deposited to fabricate an electrode. The fabricated electrode had a Pt content per unit area of 0.1 mg/cm$^2$ and surface area of 30 m$^2$/g.

Subsequently, a membrane-electrode assembly was fabricated by positioning and joining the electrodes for a fuel cell on both sides of a poly(perfluorosulfonic acid) membrane, which was NAFION™ produced by the DuPont Company. A stack as shown in FIG. 3 was fabricated by positioning separators on both sides of membrane-electrode assemblies and stacking them. A fuel cell system was fabricated by connecting a fuel supply unit including a fuel tank, a fuel pump, and an oxygen pump to the stack.

Example 2

A fuel cell system was fabricated according to the same method as in Example 1, except that Ni was used as the first catalyst. The fabricated electrode had a Pt content per unit area of 0.05 mg/cm$^2$ and surface area of 40 m$^2$/g.

Example 3

A fuel cell system was fabricated according to the same method as in Example 1, except that carbon nanofiber was grown as the nano-carbon instead of carbon nanotubes. The fabricated electrode had a Pt content per unit area of 0.05 mg/cm$^2$ and surface area of 45 m$^2$/g.

Example 4

A fuel cell system was fabricated according to the same method as in Example 1, except that carbon nanowire was grown as the nano-carbon instead of carbon nanotubes. The fabricated electrode had a Pt content per unit area of 0.07 mg/cm$^2$ and surface area of 35 m$^2$/g.

Example 5

A fuel cell system was fabricated according to the same method as in Example 1, except that carbon nanohorns were grown as the nano-carbon instead of carbon nanotubes. The fabricated electrode had a Pt content per unit area of 0.05 mg/cm$^2$ and surface area of 28 m$^2$/g.

Example 6

0.5 g of carbon black, 0.5 g of polyvinylalcohol (PVA), and 50 g of isopropyl alcohol as a solvent were mixed to prepare a composition. The composition was coated on a 200 μm-thick carbon cloth that was treated with PTFE to disperse the carbon black in the carbon cloth. Then, the carbon cloth was heat-treated at 1000° C. for 240 minutes to carbonize the polyvinylalcohol. On the surface of the microporous layer including the carbonized polyvinylalcohol, Fe as a first catalyst and acetylene gas as a carbon source along with argon gas were introduced into an 800° C. reactor for 20 minutes to grow carbon nanotubes having a length of 2000 nm.

On the surface of the carbon nanotubes, Pt was deposited to fabricate an electrode. The fabricated electrode had a Pt content per unit area of 0.1 mg/cm$^2$ and surface area of 30 m$^2$/g. A fuel cell system was fabricated according to the same method as in Example 1 using the electrode.

Comparative Example 1

A fuel cell system was fabricated according to the same method as in Example 1, except that the electrodes were fabricated by sputtering platinum on the surface of a 200 μm-thick carbon cloth.

Comparative Example 2

A fuel cell system was fabricated according to the same method as in Example 1, except that the electrodes were fabricated by growing carbon nanotubes on the surface of a 200 μm-thick carbon cloth and sputtering platinum on the surface of the carbon nanotubes.

Figure 6:
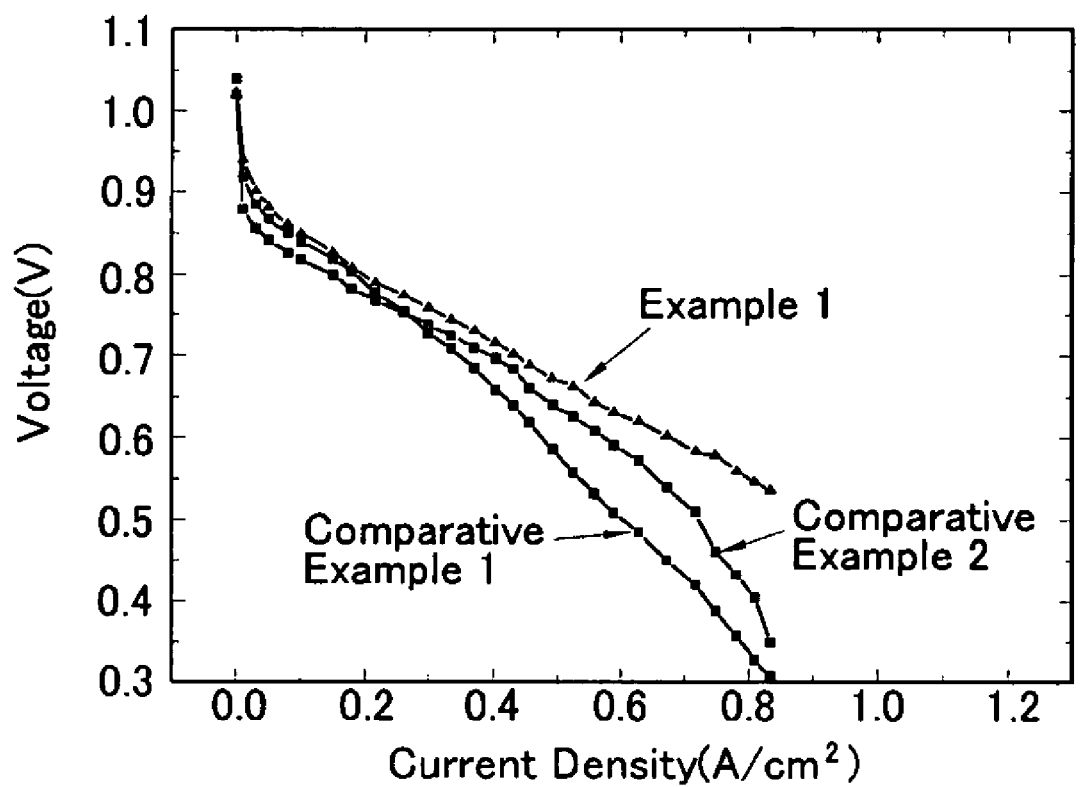
FIG. 6 is a graph showing current density and voltage of the fuel cells according to Example 1 and Comparative Examples 1 and 2.

With respect to the fuel cells fabricated in accordance with the examples and comparative examples, 50% humidified air and hydrogen were respectively supplied to the cathode and anode without back pressure, and were operated at 60° C. The voltage and current density of Example 1 and Comparative Examples 1 and 2 were measured and the results are given in FIG. 6. As can be seen from the measurement results, the fuel cell of Example 1 which included an electrode where nano-carbon was grown directly on a carbonized polymer layer, and a catalyst that was coated on the nanotubes, had a very good current density at a certain voltage.

The electrode for a fuel cell has a large surface area and thereby a small quantity of catalyst can realize maximization of electrode reactivity and improve performance of the fuel cell.

While this invention has been described in connection with what are presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode for a fuel cell system, comprising:
   a carbonaceous electrode substrate;
   a microporous layer on the surface of the electrode substrate, said microporous layer comprising a carbonized polymer; and
   a nano-carbon and catalyst layer, comprising nano-carbon on the surface of the microporous layer with a catalyst layer on the surface of the nano-carbon.

2. The electrode of claim 1, wherein the electrode substrate is selected from the group consisting of carbon paper, carbon cloth, and carbon felt.

3. The electrode of claim 1, wherein the electrode substrate has a thickness of 10 μm to 1000 μm and the microporous layer has a thickness of 1 μm to 100 μm.

4. The electrode of claim 1, wherein the microporous layer comprises a material selected from the group consisting of carbon powder, graphite, fullerene (C60), carbon black, acetylene black, activated carbon, nano-carbon, and combinations thereof.

5. The electrode of claim 1, wherein the nano-carbon and catalyst layer has a thickness of 0.05 μm to 10 μm.

6. The electrode of claim 1, wherein the nano-carbon is selected from the group consisting of carbon nanotubes (CNT), carbon nanofiber, carbon nanowire, carbon nanohorns, carbon nanorings, and combinations thereof.

7. The electrode of claim 1, wherein the nano-carbon is oriented in a direction perpendicular to the surface of the microporous layer.

8. The electrode of claim 1, wherein the nano-carbon is directly on the surface of the microporous layer.

9. The electrode of claim 1, wherein the nano-carbon has a diameter of 1 to 500 nm.

10. The electrode of claim 1, wherein the content of the catalyst included in the catalyst layer is from 0.001 to 0.5 mg/cm$^2$.

11. The electrode of claim 10, wherein the content of the catalyst included in the catalyst layer is from 0.01 to 0.05 mg/cm$^2$.

12. The electrode of claim 1, wherein the specific surface area of the catalyst included in the catalyst layer per unit weight is 10 to 500 m$^2$/g.

13. The electrode of claim 1, wherein the catalyst layer contains a metal selected from the group consisting of platinum, ruthenium, osmium, platinum-transition metal alloys, and combinations thereof.

14. The electrode of claim 1, wherein the catalyst layer is a metal catalyst on the surface of the nano-carbon.

15. The electrode of claim 14, wherein the metal catalyst is deposited using a method selected from the group consisting of sputtering, physical vapor deposition (PVD), plasma enhanced chemical vapor deposition (PECVD), thermal chemical vapor deposition, electron beam evaporation, vacuum thermal evaporation, laser ablation, and thermal evaporation.

16. The electrode of claim 1, wherein the polymer of the carbonized polymer is selected from the group consisting of polyvinylalcohol, polyacrylonitrile, phenol resin, polytetrafluoroethylene (PTFE), polyvinylidene fluoride, copolymers of polyvinylidene fluoride and hexafluoropropylene (PVdF-HFP), cellulose acetate, and combinations thereof.

17. A membrane-electrode assembly for a fuel cell, comprising a polymer electrolyte membrane, and
electrodes positioned on both sides of the polymer electrolyte membrane, where the electrodes comprise:
a carbonaceous electrode substrate;
a microporous layer on the surface of the electrode substrate, said microporous layer comprising a carbonized polymer; and
a nano-carbon and catalyst layer, comprising nano-carbon on a surface of the microporous layer with a catalyst layer on the surface of the nano-carbon.

18. A fuel cell system comprising:
at least one electricity generating unit comprising:
a membrane-electrode assembly comprising a polymer electrolyte membrane;
electrodes positioned on both sides of the polymer electrolyte membrane, wherein at least one electrode comprises a carbonaceous electrode substrate and a microporous layer on the surface of the electrode substrate, said microporous layer comprising a carbonized polymer, nano-carbon on the surface of the microporous layer, and a catalyst layer on the surface of the nano-carbon;
separators on both sides of the membrane-electrode assembly;
a fuel supplying unit for supplying hydrogen or fuel including hydrogen to the electricity generating unit; and
an oxidant supplying unit for supplying oxygen to the electricity generating unit.

19. The fuel cell system of claim 18, wherein the polymer electrolyte membrane is a proton-conducting polymer selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyether-etherketone-based polymers, polyphenylquinoxaline-based polymers, and combinations thereof.

20. The fuel cell system of claim 19, wherein the polymer electrolyte membrane is selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, aryl ketones, poly(2,2'-(m-phenylene)-5,5'-bibenzimidazole), poly(2,5-benzimidazole), and combinations thereof.

21. A method of preparing an electrode for a fuel cell, comprising:
forming a microporous layer on a surface of a carbonaceous electrode substrate;
heat-treating the carbonaceous electrode substrate with the microporous layer to carbonize a polymer in the microporous layer;
introducing a first catalyst for synthesizing nano-carbon on the surface of the microporous layer;
providing a reactive gas including a carbon source gas on the first catalyst to grow nano-carbon; and
coating a second catalyst on the nano-carbon to form a second catalyst layer.

22. The method of claim 21, wherein the electrode substrate is selected from the group consisting of carbon paper, carbon cloth, and carbon felt.

23. The method of claim 21, wherein the electrode substrate has a thickness of 10 µm to 1000 µm and the microporous layer has a thickness of 1 µm to 100 µm.

24. The method of claim 21, wherein the microporous layer comprises a material selected from the group consisting of carbon powder, graphite, fullerene (C60), carbon black, acetylene black, activated carbon, and nano-carbon, and combinations thereof.

25. The method of claim 21, wherein the first catalyst is selected from the group consisting of Fe, Ni, Co, Y, Pd, Pt, Au, Pd, Ga, Ti, V, Cr, Mn, Cu, Ta, W, Mo, Al, alloys of the metals, and metal-containing carbides, borides, oxides, nitrides, sulfides, sulfates, and nitrates.

26. The method of claim 21, wherein the carbon source gas is selected from the group consisting of hydrocarbon gas, carbon monoxide, carbon dioxide, and combinations thereof.

27. The method of claim 21, wherein the second catalyst layer has a thickness of 0.05 µm to 10 µm.

28. The method of claim 21, wherein the nano-carbon is selected from the group consisting of carbon nanotubes (CNT), carbon nanofiber, carbon nanowire, carbon nanohorns, carbon nanorings, and combinations thereof.

29. The method of claim 21, wherein the nano-carbon has a diameter of 1 to 500 nm.

30. The method of claim 21, wherein the content of the catalyst included in the second catalyst layer is from 0.001 to 0.5 mg/cm$^2$.

31. The method of claim 21, wherein the specific surface area of the catalyst included in the second catalyst layer per unit weight is in the range of 10 to 500 m$^2$/g.

32. The method of claim 21, wherein the second catalyst is deposited using a method selected from the group consisting of sputtering, physical vapor deposition (PVD), plasma enhanced chemical vapor deposition (PECVD), thermal chemical vapor deposition, electron beam evaporation, vacuum thermal evaporation, laser ablation, thermal evaporation, and combinations thereof.

33. The method of claim 21, further comprising removing the first catalyst from the microporous catalyst layer.

34. The method of claim 33, wherein the first catalyst is removed by acid treatment.

* * * * *